(12) United States Patent
Hidai et al.

(10) Patent No.: US 7,065,621 B2
(45) Date of Patent: Jun. 20, 2006

(54) SYSTEM AND METHOD FOR IMPLEMENTING A HIDDEN ADDRESS IN A COMMUNICATION MODULE

(76) Inventors: Takashi Hidai, 3683 Louis Rd., Palo Alto, CA (US) 94303; Peter H. Mahowald, 71 San Juan Ct., Los Altos, CA (US) 94022

( * ) Notice: Subject to any disclaimer, the term of this patent is extended or adjusted under 35 U.S.C. 154(b) by 199 days.

(21) Appl. No.: 10/368,954

(22) Filed: Feb. 18, 2003

(65) Prior Publication Data

US 2004/0162956 A1     Aug. 19, 2004

(51) Int. Cl.
*G06F 12/00* (2006.01)
(52) U.S. Cl. .............................. 711/163; 711/164
(58) Field of Classification Search ............ 711/152, 711/163–164; 713/182–185, 187, 202, 203
See application file for complete search history.

(56) References Cited

U.S. PATENT DOCUMENTS

| 4,864,542 A | 9/1989 | Oshima et al. |
| 5,226,137 A | 7/1993 | Bolan et al. |
| 5,594,793 A | 1/1997 | Bahout |
| 5,845,066 A * | 12/1998 | Fukuzumi .................. 713/200 |
| 6,742,094 B1 * | 5/2004 | Igari ........................... 711/163 |
| 2003/0212871 A1 | 11/2003 | Suzuki et al. |
| 2004/0139247 A1 | 7/2004 | Mahowald et al. |

FOREIGN PATENT DOCUMENTS

| GB | 2248324 A | 1/1992 |
| WO | WO91/19067 | 12/1991 |

\* cited by examiner

*Primary Examiner*—Nasser Moazzami

(57) ABSTRACT

A module that detects a password at a hidden address in order to implement a change in an address scheme. The module includes a bus and a memory having a memory address which is coupled to the bus. The module further includes an interface-comparing circuit that monitors data traffic on the bus and receives a predetermined password. The module still further includes a password-comparing circuit which is coupled to the interface-comparing device and allows access to the memory in response to the interface-comparing circuit receiving the proper predetermined password. Such a module can implement a change in the module's configuration or operating characteristics. Such changes include acknowledging a new memory address into the address scheme, unacknowledging an existing memory address in the address scheme and downloading a new operating program having a new address scheme to a controller coupled to a second bus.

25 Claims, 4 Drawing Sheets

SYSTEM AND METHOD FOR IMPLEMENTING A HIDDEN ADDRESS IN A COMMUNICATION MODULE

BACKGROUND OF THE INVENTION

Referring to FIG. 1, a conventional fiber-optic communication module 100, which may be used in a digital fiber-optic communication system, typically includes a fiber-optic receiver section 101, a fiber-optic transmitter section 102, and a controller section 103, which are all coupled via an internal bus 105. In some communication modules (not shown), the internal bus is an analog bus. However, because of the many signals to be communicated between the receiver, transmitter and controller, the number of wire traces needed in such an analog bus may become too numerous for practical application. Therefore, the internal bus 105 is a digital bus. In operation, the controller 103 controls and monitors the receiver 101 and transmitter 102 via the bus 105.

The communication module 100 also communicates with one or more external devices 120, via an external bus 107. Typical external devices 120 include diagnostic devices and configuration devices. External devices are often used during manufacturing of the communication module 100 for diagnostics during processing and verification after manufacturing. Furthermore, external devices are typically used to download programmable capabilities to the communication module in order to establish a desired performance setting. The external bus 107 is coupled to the transmitter 102, (although it may be coupled to the controller 103 or the receiver 101). This allows the external device 120 to communicate with the receiver 101 and controller 103 via the transmitter 102 and bus 105, which act as an interface to the external device 120.

The external bus 107, which is typically a two-wire standard serial interface, may be used to communicate to and from the external device 120 imperative data about the module, such as, for example, specialized factory data and diagnostics data. During manufacture, testing, qualification, and failure analysis, it is advantageous to be able to store and retrieve this imperative data which may be stored in registers internal to the module 100. It is also advantageous to operate the module 100 in unique ways to test special features or to provide specialized user functionality for specific applications. Therefore, imperative data about these specialized functions may be retrieved from registers that reside within the module 100 as well. However, limited address space and the need to keep proprietary imperative data from an end user present a problem because all registers coupled to the busses 105 and 107 are typically accessible.

In the communication module 100, all electronic components that are coupled to a respective bus (either internal bus 105 or external bus 107) are typically assigned a predetermined bus address for each register or sets of registers. This is referred to as an address scheme. Typically, a standard two-wire serial bus may assign 16 addresses that are uniquely identified by 4 bits of an 8-bit address. The remaining 4 bits in the 8-bit address are unused or designate other functions, such as a read or write command. Other address schemes may have different bit lengths for addresses and may employ the non-address bits for other purposes.

One wire of the standard two-wire serial bus 105 is a clock line that receives a clock signal from the bus master and the other line is a data line that receives data from a sender. When a sender (a component initiating a write or read) is to write data to or read data from another component (a receiver), the sender places the address of the intended register within the receiver component on the bus; i.e., sends an 8-bit address on the data line, which is clocked by the bus master. Each register or set of registers that is assigned an address in the address scheme and coupled to the bus receives the 8-bit address at an interface-comparing device (not shown), which determines whether the 4-bits of the 8-bit address on the data line matches the 4-bit address that corresponds to its respective register. If a match is found, the interface-comparing device returns an acknowledgment bit on the data line to indicate that the address exists and is ready to receive further 8-bit packets of data (offset, written data, etc.). Typically, only one register or set of registers may be assigned a particular address in an address scheme such that its respective interface-comparing device is the only device that can return an acknowledgement bit in response to the particular address.

Registers that are associated with a respective address within an address scheme are visible, i.e., readable and writable, to all electronic components and devices that are connected to the external 107 and internal 105 busses, respectively. This is problematic because it is sometimes desired to not allow all components and devices to write to and read from registers that store proprietary or other imperative data or to change the operating mode of the module itself. As such, it is desired to maintain the anonymity of the address of any registers containing imperative data and only allow access during troubleshooting, fault analysis, or other similar situations.

One solution is to implement an entire separate (from the external bus 107) bus connection (not shown) for data exchange and communication between an external device 120 and the registers for storing the imperative data. This solution may increase the complexity and pinout of the module 100, and may introduce noise on the internal bus 105. Furthermore, it is often difficult to physically probe with the internal bus 105 which is coupled to internal registers that store the imperative data from the outside of the communication module 100 because the internal registers or the internal bus 105 may be within an intermediate, and thus, inaccessible, layer of a printed circuit board. Thus, it is difficult to physically probe analog or digital internal test points and is problematic in the high volumes necessary.

SUMMARY OF THE INVENTION

In one aspect of the invention, a module includes a bus and a memory having a memory address which is coupled to the bus. The module further includes an interface-comparing circuit that monitors data traffic on the bus and receives a predetermined password. The module still further includes a password-comparing circuit which is coupled to the interface-comparing device and allows access to the memory in response to the interface-comparing circuit receiving the proper predetermined password.

Such a module can implement a change in the module's configuration or operating characteristics. Such changes include acknowledging read and write commands to a newly visible address, i.e., allowing the interface-comparing device to return an acknowledgement bit on the bus when data is addressed to the hidden address. Further, an existing memory address may be unacknowledged by not allowing its respective interface-comparing device to return an acknowledgement bit on the bus when data is addressed to its corresponding address. Additionally, other actions may be taken in response to a proper password such as downloading a new operating program having a new address scheme to a controller coupled to a second bus or to couple the first bus to a second bus.

A hidden address within a module formed in accordance with an embodiment of the invention remains inaccessible to all components coupled to the bus until the proper password is detected by its corresponding password-comparing device. Until then, read and write commands are ignored and the interface-comparing device is unable to return an acknowledgment signal on the bus to indicate to the sender of the read or write command that the command has been received and executed. As such, data stored in the registers associated with the hidden address cannot be read from or written to until the proper password is placed on the bus and addressed to the hidden address. Therefore, imperative data may be stored and protected until a technician with the proper password can retrieve and modify it.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The following discussion is presented to enable a person skilled in the art to make and use the invention. The general principles described herein may be applied to embodiments and applications other than those detailed below without departing from the spirit and scope of the present invention. The present invention is not intended to be limited to the embodiments shown, but is to be accorded the widest scope consistent with the principles and features disclosed or suggested herein.

Figure 1:
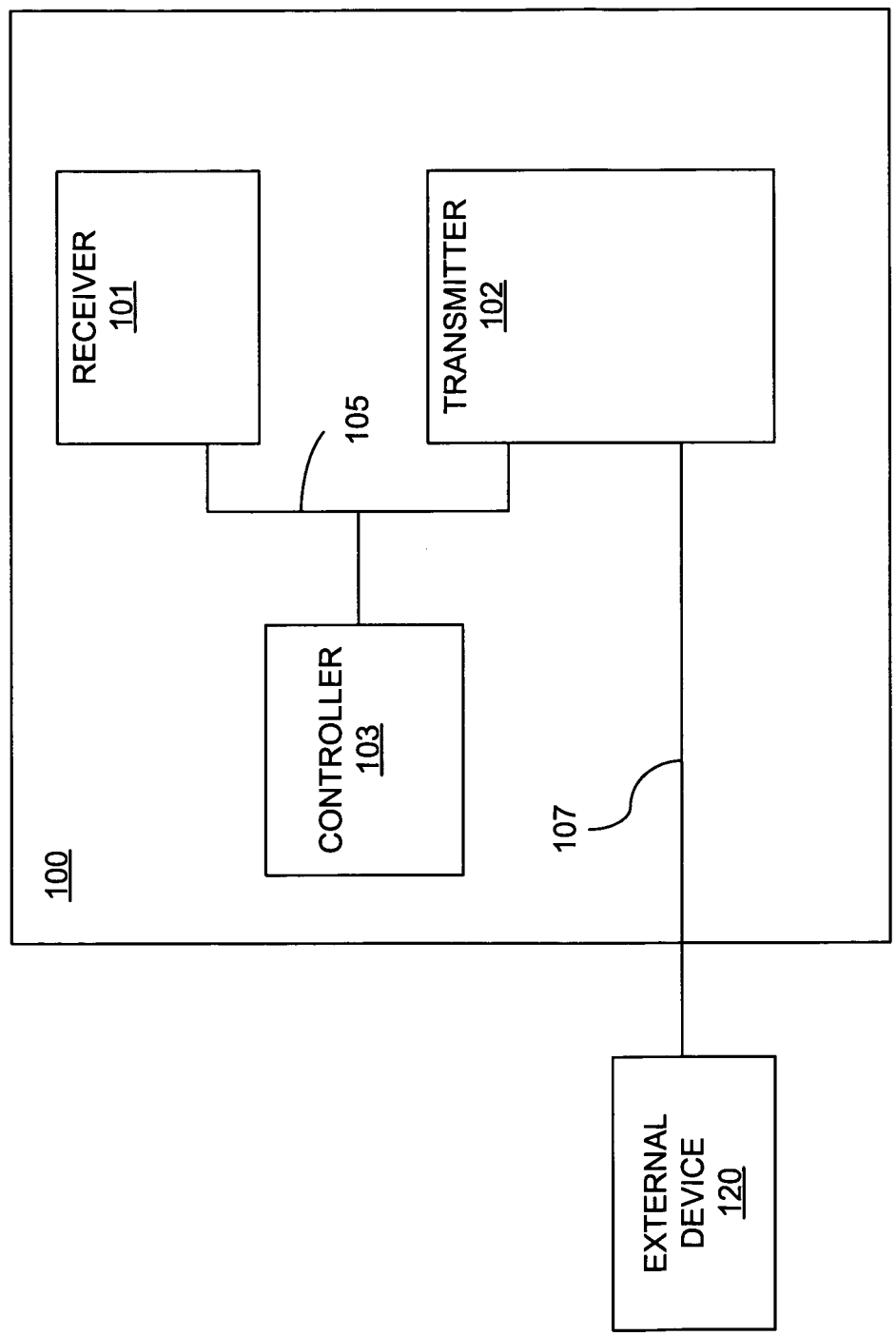
FIG. 1 is a block diagram of a conventional communication module.
Figure 2:
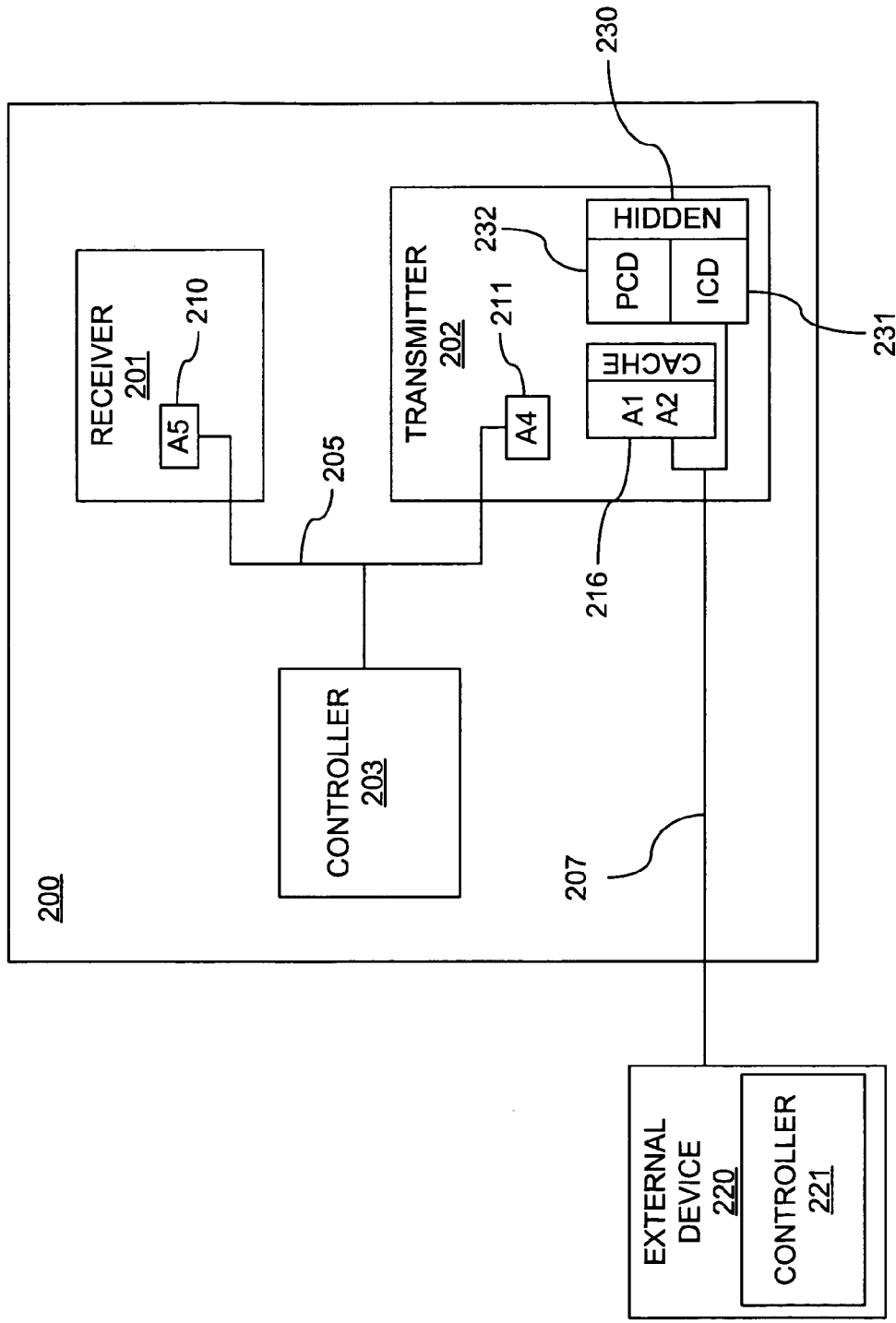
FIG. 2 is a block diagram of a communication module according to an embodiment of the invention.

FIG. 2 is a block diagram of a fiber-optic communication module 200 according to an embodiment of the invention. Like the communication module 100 of FIG. 1, the communication module 200 includes a plurality of internal electronic components including a fiber-optic receiver 201, a fiber-optic transmitter 202, and a controller 203, which are coupled to an internal two-wire serial digital bus 205. Additionally, the communication module 200 is also coupled to an external bus 207, (also a two-wire serial digital bus) which is designed to allow an external device 220 to read from and write to registers that interface with the external bus 207. Here, the external bus 207 is shown as coupled to the transmitter 202, however, the external bus 207 may be coupled to any internal electronic component, such as, for example, the controller 203. A plurality of memory-addressed registers, one or more of which may be associated with a hidden address 230, reside within the various electronic components of the module 200 and are coupled to either the internal bus 205 or the external bus 207.

In some embodiments, one or more registers are coupled to both busses. The operation of the communication module 200, as well as the facilitation of communication between the various electronic components and registers (addressed as hidden or otherwise), is described below.

The controller 203 is the bus master for the internal bus 205 and clocks communications between the internal electronic components such as the receiver 201 and the transmitter 202. Each of these electronic components may be disposed on a respective integrated circuit or may comprise different areas of a single monolithic integrated circuit. Likewise, the internal bus 205 may be disposed within an integrated circuit or may comprise a separate bus structure within the communication module 200. The internal bus 205 allows data to be read from and written to registers that are coupled to the internal bus 205 and visible in the address scheme of the internal bus 205. For example, the internal bus 205 is coupled to the A5 registers 210 in the receiver 201 that are visible as the A5 address and the A4 registers 211 in the transmitter 202 that are visible as the A4 address. In one embodiment, there are 256 A5 registers 210 and 256 A4 registers 211 accessible by a conventional address offset method.

The external device 220 also includes a controller 221, which is the bus master for the external bus 207 and which clocks communications between the internal electronic components and the external device 220. The external bus 207 allows data to be read from and written to registers that are coupled to the external bus 207 and that are visible in its address scheme. For example, the external bus 207 is coupled to the A1 and A2 cache registers 216 of the transmitter 202 that are visible as the A1 and A2 addresses respectively. The implementation of the cache registers 216 is disclosed in related U.S. patent application Ser. No. 10/346,479 entitled Cache for EEPROM Emulation using Firmware Controller in a Fiber-Optic Transceiver filed on Jan. 15, 2003, which is assigned to Agilent Technologies of Palo Alto, Calif. and which is incorporated by reference. Although the bus 207 is described as "external", a portion of the bus 207 may be disposed within the module 200. Consequently, "external" refers to the fact that the bus 207 allows a direct connection between one or more external devices 220 and registers coupled to the external bus 207, such as the A1 and A2 cache registers 216.

Still referring to FIG. 2, the transmitter 201 also includes a set of registers associated with a hidden address 230. The hidden address 230 will not respond to read or write commands addressed to it by other components coupled to the bus 207 until an activation password is written to the bus 207 (or to whichever bus it is coupled). The hidden address 230 will not respond because its associated interface-comparing device 231 does not return an acknowledgement bit when it recognizes its respective address until a flag is set in the interface-comparing device 231 to indicate that a proper password has been received.

In the embodiment shown in FIG. 2, the interface-comparing device 231 is coupled directly to the external bus 207 and an associated password-comparing device 232. As with any interface-comparing device, the interface-comparing device 231 monitors traffic on the bus 207 to which it is coupled. Typically, when a device sends a read or write command to the bus, the command is arranged into three 8-bit segments. The first segment is the 8-bit address that also includes a designation as to whether the command is read or write. The second segment is an associated offset that designates a specific register associated with the 8-bit address. The third segment (and subsequent segments) is typically data.

For each 8-bit address written to the external bus 207, the interface-comparing device 231 determines whether the 8-bit address matches the hidden address 230. If the 8-bit address does not match the hidden address 230, the interface-comparing device 231 does nothing and continues to monitor the data traffic on the external bus 207. If the 8-bit address does match the hidden address 230, then the password-comparing device 232 determines if a subsequent 8-bit segment (or portion of the segment) written to the bus 207 matches a predetermined password. If a subsequent segment does not match the password, then the password-comparing device 232 does nothing and the interface-comparing device 231 continues to monitor the traffic on the external bus 207. If a subsequent segment matches the predetermined password, then the password-comparing device 232 sets a flag in the interface-comparing device 231 that allows the interface-comparing device to return an acknowledgement bit whenever the hidden address 230 (now visible) is written to or read from.

In an alternative embodiment, a visible reserved address (not shown) may be used to set the acknowledgement return flag in the interface-comparing device 231 of the hidden address 230. In the same manner as described above, a password-comparing device (not shown) associated with the visible reserved address determines if a subsequent segment (in a series of segments addressed to the visible reserved address) matches a predetermined password. If so, the acknowledgement return flag of the interface-comparing device 231 of the hidden address 230 is set and the hidden address 230 becomes visible.

In yet another embodiment, the interface-comparing device 231 of the hidden address 230 may be coupled to the external bus 207, but when the predetermined password is detected by the password-comparing device 232, as described above, the interface-comparing device 231 begins monitoring data traffic on the internal bus 205 and will send acknowledgement bits in response to data read from and written to the hidden address 230 on the internal bus 205. As such, the hidden address 230 is now accessible by the controller 203. This embodiment may require the hidden address 230 to be coupled (connection not shown) to the internal bus 205 as well.

The newly visible hidden address 230 may, however, exceed the typically limited number of available addresses in some communication modules. As such, the hidden address 230 may be implemented in conjunction with a normally visibly address, such as the A2 address 216. In this configuration, the actual address for the registers associated with the hidden address 230 and the actual address of the registers associated with the A2 address 216 are the same but only one or the other is visible at any given time. When the proper password is detected by the password-comparing device 232 of the hidden address 230, its acknowledge return flag is set, thereby, allowing the return of an acknowledgment bit for the hidden address 230. Simultaneously, the acknowledge return flag of the interface-comparing device associated with the A2 address 216 is cleared, thereby, prohibiting the return of an acknowledgement bit for the A2 address 216. One embodiment of the invention includes a static RAM chip that has dual-port memory capabilities to implement the hidden address 230/A2 address 216 tandem. As such, when a hidden address 230 becomes visible the normally visible A2 address 216 simultaneously becomes invisible. The procedure may be repeated to make the A2 address visible and the hidden address invisible again. In this fashion, the number of addresses in the communication module remains constant.

Another embodiment of the invention includes the ability to use data stored in the registers associated with the hidden address 230 in order to change the operating parameters of the entire communication module 200. As was described above, the external device 220 may write a predetermined password to the external bus 207 wherein the hidden address 230, in conjunction with the interface-comparing device 231 and password-comparing device 232, will recognize the address and password placed on the bus 207. Once "activated", the data stored in the registers associated with the hidden address 230 may implement a number of different actions. The data in the registers may include a boot-loader program that downloads a different operating program to the component storing the current operating program (typically the controller 203) for the communication module 200. In another embodiment, the data may enable one or more ports to be turned on after the password has been recognized. In yet another embodiment, the hidden address 230 may be used to activate a diagnostic switch. A module that includes a diagnostic switch is disclosed in related U.S. patent application Ser. No. 10/345,899 entitled Switch For Coupling One Bus To Another Bus, which was filed on Jan. 15, 2003, is assigned to Agilent Technologies of Palo Alto, Calif. and which is incorporated by reference.

Figure 3:
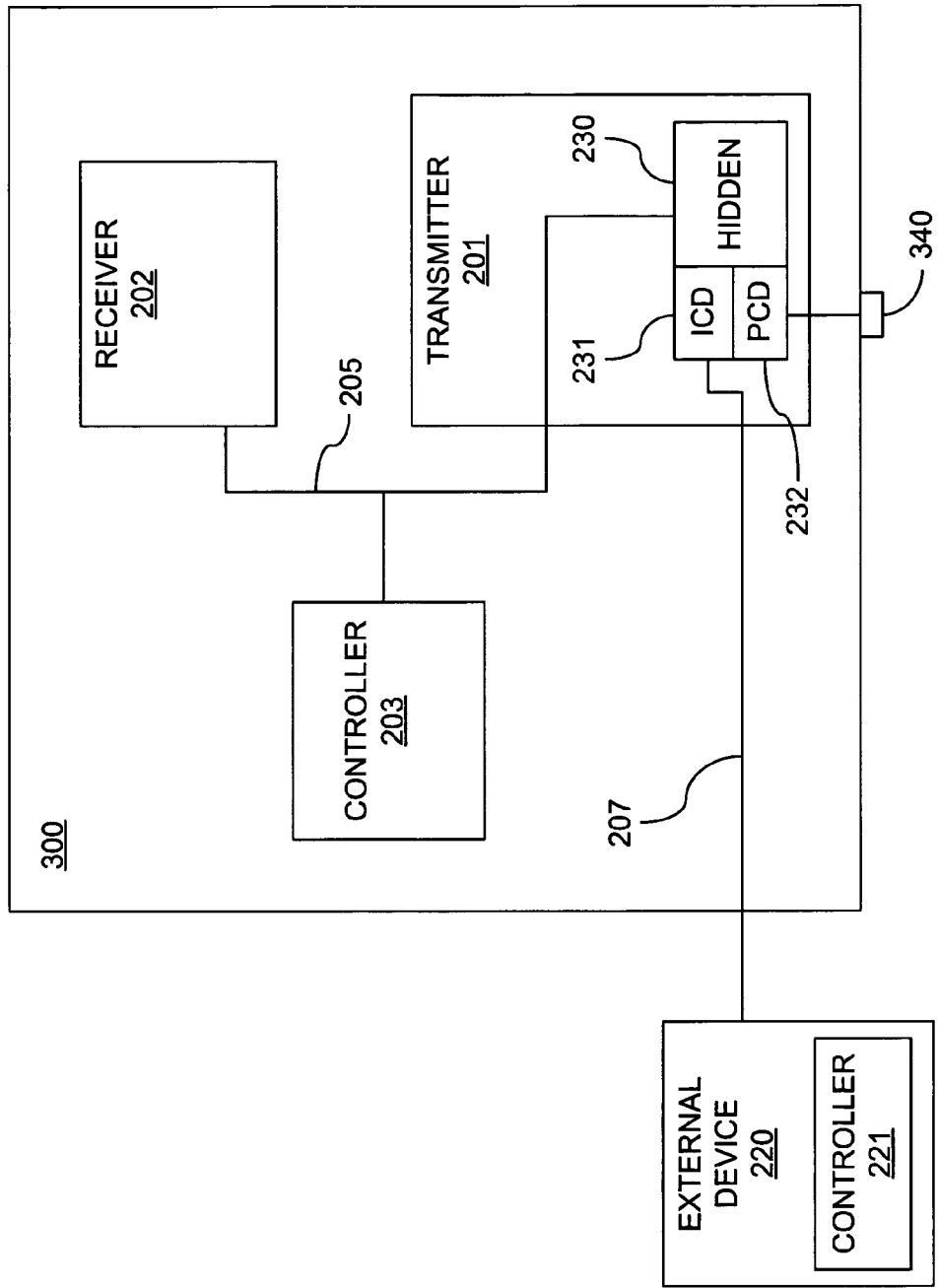
FIG. 3 is a block diagram of a communication module according to another embodiment of the invention.

FIG. 3 is a block diagram of a communication module 300 according to another embodiment of the invention. In this embodiment, a hardware implemented password is used to activate a hidden address 230. For the ease of discussion, reference numerals to elements of the communication module 300 that are similar to the elements of the communication module 200 of FIG. 2 are repeated where convenient.

As was described above with respect to FIG. 2, the transmitter 201 of the communication module 300 includes a hidden address 230 with an associated interface-comparing device 231 and password-comparing device 232. The hidden address 230 is not visible in any address scheme (either the internal bus 205 or the external bus 207). The interface-comparing device 231 is coupled to the external bus 207 and the password-comparing device 232 is coupled to a switch 340. The password-comparing device 232 monitors the switch 340, and, upon activation of the switch 340, sets a flag in the interface-comparing device 231 allowing acknowledgement bits to be returned on the respective bus in response to the hidden address 230 being read from or written to. The switch 340 may be implemented as a external manual switch, a jumper switch on a printed circuit board, a hardware switch, or a software driven switch.

In an alternative embodiment, the activation of the switch 340 may cause the interface-comparing device 231 to begin monitoring the traffic on a respective bus. As such, the interface-comparing device 231 compares all addresses written to the monitored bus as described above with respect to the communication module 200 of FIG. 2. The deactivation of the switch 340 may then cause the hidden address 230 to be removed from the respective address scheme, i.e., no acknowledgement bit may be returned.

Referring to FIGS. 2 and 3, although the hidden address 230, interface-comparing device 231, and password comparing device 232 are described in conjunction with a fiber-optic communication module 200 and 300, they, or similar hidden-address components, may be incorporated into types of circuits modules as well. For clarity, only incorporation of the modules 200 is discussed in detail.

Figure 4:
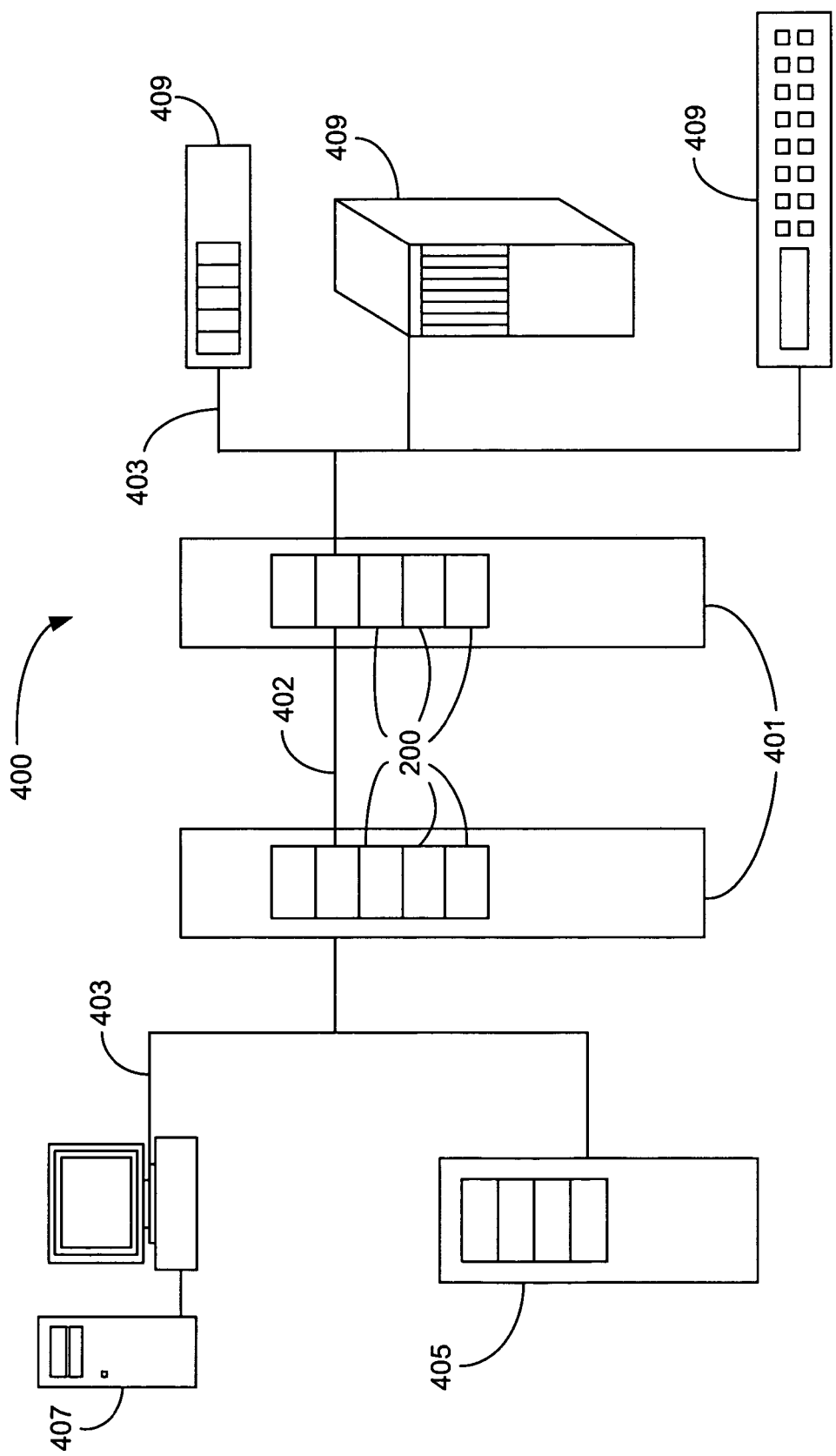
FIG. 4 is a block diagram of a digital communication system that incorporates one or more of the communication modules of either FIG. 2 or FIG. 3 according to an embodiment of the invention.

FIG. 4 is a block diagram of a digital communication system 400 that incorporates one or more communication modules 200 or 300 of FIG. 2 or 3 in accordance with an embodiment of the invention. The system 400 includes devices operable to communicate digitally with each other. Such devices include high-volume database computers 405, server computers 407, and network devices 409 (hubs, routers, switches). A conventional TX/RX link 403 couples the devices to a communication hub 401 that is operable to house several communication modules 200.

In one embodiment, each module 200 comprises one or more channels for receiving and transmitting data via a fiber-optic network. In one embodiment, each communication module 200 incorporates eight independent data channels (four transmit and four receive channels) operating from 1 to 3.2 Gb/s per channel for digital communication between devices. Such a communication module 200 is disclosed in a related U.S. patent application Ser. No. 10/327,216 entitled Integrated Multichanned Laser Driver and Photodetector Receiver which was filed on Dec. 20, 2002, which is assigned to Agilent Technologies of Palo Alto, Calif., and which is incorporated by reference. The communication module 200 can then communicate with other modules through a fiber-optic communication link 402. As such, devices such as high-volume database computers 405, server computers 407, and network devices 409 (hubs, routers, switches etc.) can communicate efficiently and effectively using the multichannel capabilities of the communication modules 200.

We claim:

1. A module, comprising:
a first bus having an address scheme;
a memory having a memory address and including at least one hidden storage memory location, and the memory being coupled to the first bus;
an interface-comparing circuit operable to monitor data traffic on the first bus and to receive a predetermined password;
a password-comparing circuit coupled to the interface-comparing device and operable in response to the interface-comparing circuit receiving the predetermined password to change the address scheme and to thereby allow access to each one of the hidden storage locations in the memory; and
wherein the memory includes a visible reserved address and wherein the password-comparing circuit is associated with the visible reserved address, and password-comparing circuit being operable upon receiving the visible reserved address and thereafter receiving the predetermined password to set a flag in the interface-comparing circuit that makes at least one of the hidden storage locations visible on the first bus.

2. The module of claim 1 wherein the first bus comprises a two-wire serial bus.

3. The module of claim 1, further comprising a fiber optic transmitter coupled to the first bus.

4. The module of claim 1, further comprising a fiber-optic receiver coupled to the first bus.

5. The module of claim 1 wherein the password-comparing circuit is operable to allow the interface-comparing circuit to return an acknowledgement bit to the bus in response to receiving the memory address on the first bus.

6. The module of claim 1 wherein the password-comparing circuit is operable to allow a second interface-comparing circuit associated with a second memory address to return an acknowledgement bit to the bus in response to receiving the memory address on the first bus.

7. The module of claim 1, further comprising a second bus, wherein the password-comparing circuit is operable to allow coupling the first bus to the second bus.

8. The module of claim 1 wherein each hidden storage location stores associated data and wherein the password-comparing circuit is further operable to transfer to a controller coupled to the first bus the data stored in at least some of the hidden stored locations to change operating parameters of the module.

9. The module of claim 1, further comprising a second bus, wherein the password-comparing circuit is operable to allow or to prohibit a second interface-comparing circuit associated with a second memory address to return an acknowledgement bit to the second bus in response to receiving the memory address on the first bus.

10. A fiber-optic communication system comprising:
a first module comprising:
a memory having a corresponding memory address and coupled to a bus having an address scheme;
an interface-comparing device operable to monitor data traffic on the bus and operable to receive a predetermined password, and
a password-comparing device coupled to the interface-comparing device and operable to change the address scheme in response to the interface-comparing device receiving the predetermined password;
a second module comprising:
a memory having a corresponding memory address and coupled to a bus having an address scheme;
an interface-comparing device operable to monitor data traffic on the bus and operable to receive a predetermined password, and
a password-comparing device coupled to the interface-comparing device and operable to change the address scheme in response to the interface-comparing device receiving the predetermined password; and
a first communication device coupled to the first module and a second communication device coupled to the second module, the first communication device operable to transmit a digital signal to the second communication device via the fiber-optic communication link and the second communication device operable to transmit a digital signal to the first communication device via the fiber-optic communication link.

11. The fiber-optic communication system of claim 10 further comprising a high-volume database computer and wherein the communication system is part of the high-volume database computer.

12. The fiber-optic communication system of claim 10 further comprising a server computer and wherein the communication system is part of the server computer.

13. The fiber-optic communication system of claim 10 further comprising a network device and wherein the communication system is part of the network device.

14. The fiber-optic communication system of claim 13 wherein the network device is one of a hub, router, and a switch.

15. A method, comprising:
detecting a predetermined password on a first bus;
changing an address scheme associated with the bus upon detecting the predetermined password;
providing access to at least one hidden storage location over the bus through changing the address scheme;
prior to detecting the predetermined password on the first bus, denying access to each hidden storage location via the bus;

reading data from at least one of the hidden memory locations and changing an operational mode of a circuit using the read data; and downloading the data read from at least one of the hidden memory locations to a controller coupled to the bus, with the downloaded data changing an operational mode of the controller.

16. The method of claim 15 further comprising coupling the first bus to a second bus.

17. The method of claim 15 wherein detecting comprises determining that a received binary code matches a predetermined binary code.

18. The method of claim 15 wherein detecting comprises determining that a voltage level at a detection node matches a predetermined voltage level.

19. The method of claim 15 wherein detecting is in response to the activation of a switch.

20. A method, comprising:
requesting access to a hidden storage location not visible on a bus;
prohibiting access to the hidden storage location if the request does not include a predetermined pass word;
granting access to the hidden storage location if the request includes the predetermined pass; and
receiving data over the bus and storing this data in the hidden storage location, the data having a value that functions to change an operational mode of circuitry coupled to the bus.

21. The method of claim 20 wherein prohibiting access comprises prohibiting the hidden storage location from acknowledging the request if the request does not include the predetermined password and wherein granting access comprises causing the hidden storage location to acknowledge the request if the request includes the predetermined password.

22. The method of claim 20 wherein circuitry coupled to the bus comprises circuitry in a communications module and wherein the data changes an operational mode of the communications module.

23. The method of claim 20 wherein receiving data over the bus comprises receiving optical signals over the bus.

24. A communications module, comprising:
a bus;
a plurality of visible storage locations, the visible storage locations being accessible from the bus to transfer data to and from such storage locations;
at least one hidden storage location, each hidden storage location being accessible from the bus only upon an associated enable signal being activated and each hidden storage location having an associated password; and
a circuit coupled to the bus to receive addresses applied on the bus and to each hidden storage location, the circuit operable to determine whether an address placed on the bus is an address associated with one of the hidden storage locations and upon determining the address is associated with one of the hidden storage locations the circuit being operable in response to receiving the associated password on the bus to activate the associated enable signal to make the hidden storage location accessible on the bus.

25. The communications module of claim 24 further including a controller located in the module, and wherein the circuit is further operable to transfer data stored in accessed hidden storage locations to the controller to change an operational mode of the module.

* * * * *

UNITED STATES PATENT AND TRADEMARK OFFICE
CERTIFICATE OF CORRECTION

| | |
|---|---|
| PATENT NO. | : 7,065,621 B2 |
| APPLICATION NO. | : 10/368954 |
| DATED | : June 20, 2006 |
| INVENTOR(S) | : Takashi Hidai et al. |

It is certified that error appears in the above-identified patent and that said Letters Patent is hereby corrected as shown below:

Column 9, Line 22, Claim 20, delete "pass word;" and insert -- password; --;

Column 9, Line 24, Claim 20, delete "pass;" and insert -- password; --.

Signed and Sealed this

First Day of June, 2010

David J. Kappos
*Director of the United States Patent and Trademark Office*